US008729261B2

(12) United States Patent
Lee et al.

(10) Patent No.: US 8,729,261 B2
(45) Date of Patent: May 20, 2014

(54) RECRYSTALLIZATION METHOD OF FINE SPHERICAL RDX PARTICLE

(75) Inventors: Byoung-Min Lee, Seoul (KR); Youn-Woo Lee, Seoul (KR); Hyoun-Soo Kim, Daejeon (KR); Joo-Seung Chae, Daejeon (KR)

(73) Assignee: Agency for Defense Development, Daejeon (KR)

( * ) Notice: Subject to any disclaimer, the term of this patent is extended or adjusted under 35 U.S.C. 154(b) by 143 days.

(21) Appl. No.: 13/281,770

(22) Filed: Oct. 26, 2011

(65) Prior Publication Data

US 2012/0276385 A1 Nov. 1, 2012

(30) Foreign Application Priority Data

Apr. 26, 2011 (KR) ........................ 10-2011-0039141

(51) Int. Cl.

*C07D 251/06* (2006.01)
*C06B 25/34* (2006.01)
*C06B 45/02* (2006.01)

(52) U.S. Cl.

USPC ........................... 544/180; 149/92; 149/109.6

(58) Field of Classification Search

USPC ................................. 544/180; 149/92, 109.6
See application file for complete search history.

(56) References Cited

U.S. PATENT DOCUMENTS 5,389,263 A * 2/1995 Gallagher et al. ............ 210/729

FOREIGN PATENT DOCUMENTS

KR 10-0924236 B1 10/2009

OTHER PUBLICATIONS

Meulenbrugge et al. Proc. Int. Symp. Energ. Mater. Technol. 1995, 297-302; CA 128: 117022m, 1998. CA abstract provided.*
Stepanov et al. International Annual Conference of ICT, 36th (Energetic Materials), 189/1-189/8;CA 144:353348 2005. CAPLUS Abstract provided.*
Lee, B.M. et al., "Preparation of submicron-sized RDX particles by rapid expansion of solution using compressed liquid dimethyl ether" The Journal of Supercritical Fluids (Jul. 2011) pp. 251-258, vol. 57, issue 3.

* cited by examiner

*Primary Examiner* — Venkataraman Balasubramanian
(74) *Attorney, Agent, or Firm* — Scully, Scott, Murphy & Presser, P.C.

(57) ABSTRACT

The present invention relates to a method for recrystallizing fine spherical cyclotrimethylenetrinitramine (Research Department Explosive, hereinafter, referred to as "RDX") particles, and the method for recrystallizing fine spherical RDX particles according to the present invention may include (a) introducing a powder material containing RDX into a container, (b) introducing a dimethylether compressed gas into the container and dissolving the RDX to form a RDX solution, (c) releasing and decompressing the RDX solution into atmospheric pressure to form crystallized RDX particles, and (d) separating and collecting the RDX particles.

6 Claims, 11 Drawing Sheets

RECRYSTALLIZATION METHOD OF FINE SPHERICAL RDX PARTICLE

RELATED APPLICATION

This application claims the benefit of Korean Patent Application No. 10-2011-0039141, filed on Apr. 26, 2011, which is hereby incorporated by reference for all purposes as if fully set forth herein.

BACKGROUND OF THE INVENTION

1. Field of the Invention

The present invention relates to a method for recrystallizing fine spherical cyclotrimethylenetrinitramine (Research Department Explosive, hereinafter, referred to as "RDX") particles, and more particularly, to a method for recrystallizing fine spherical RDX particles using a dimethylether compressed gas.

2. Background of the Invention

In case of high explosive powders and propellants, about 85 to 95 weight percent of total composition is used with a powder form, thus requiring an intermediate process in which chemical particles are controlled so as to have properties suitable for an end product from synthesized explosive chemicals prior to the final recrystallization process. The properties of those explosive chemicals may be determined by the size, distribution and shape of particles, which may be controlled to have properties needed for each application field by changing the recrystallization method or process condition.

The fine structure of explosive powder particles greatly affects on a combustion or explosive behavior thereof wherein heat or mass transfer rate governs the energy generation speed, and its transfer rate may be primarily determined by the size of particles or uniformity of the end product. Accordingly, the rate-limiting step governing an overall reaction speed may be made from a heat or mass transfer process to a chemical reaction step by recrystallizing particles constituting the end product in a very small size. Due to this reason, a lot of studies on recrystallizing fine explosive particles have been carried out, and it has been reported that they have a much higher combustion speed and a low shock sensitivity, and a temperature of generating the maximum energy is also low.

However, powder particles used to recrystallize high explosive powders and propellants are weak against heat and shock and thus a wet process should be used therefor, but it is known there is a limit in recrystallizing particles having a size of less than one micrometer in the related art using a milling method, a recrystallization from solution method, an emulsion crystallization method, a spray crystallization method, an ultrasonic method, or the like. In particular, in case of recrystallizing small particles having a nano size, it is known difficult to control the size or distribution of particles using the grinding or recrystallization from solution method which is primarily used in the existing industries. On the other hand, in case of the spray crystallization/drying process, it is known that even particles with a size of less than 5 μm can be recrystallized, but the process is not suitable to recrystallize powder particles since a high-temperature evaporation process for removing solvent is required. Furthermore, it is difficult to prevent a particle crystalline phase from being contaminated with solvent in case of a wet crystallization process, and it has a fundamental disadvantage in applying to the recrystallization of powder particles weak to shock in case of a jet milling process.

Supercritical fluid is defined as "a fluid at a temperature and pressure above its critical point", and has distinct characteristics not shown in the existing solvents. The properties of a solvent may be determined according to interactions between molecules determined by the kind of molecules and distance between molecules. Accordingly, the distance between molecules is not almost changed because liquid solvent is incompressible and thus it may be difficult to expect a great change of the properties as a single solvent. Supercritical fluid can continuously change density from a sparse state close to ideal gas to a high-density state close to liquid density, thereby regulating a solvation and molecular clustering state as well as equilibrium properties (solubility, entrainer effect), transfer properties (viscosity, diffusion coefficient, thermal conductivity) in a fluid. Supercritical fluid process is a process of selectively separating and recrystallizing a high pure and higher value-added product at a high mass transfer rate using thermodynamic characteristics (high solubility, selectivity, compressibility, and voluntary separation due to decompression) and flow properties (low viscosity, standard tension, high diffusion coefficient) and the like, and maximizing an energy use efficiency during the extraction, separation and drying process with the reuse of extraction solvent and the removal of the remaining solvent in the product.

For the process of recrystallizing particles using a supercritical fluid, there are used a rapid expansion of supercritical solutions (RESS), a supercritical antisolvent precipitation (SAS), a particle generation from gas-saturated solutions (PGSS), and the like. In particular, among the above processes, the RESS process may be advantageous if a solute can be dissolved in a supercritical fluid, but the SAS process may be advantageous if a solute cannot be dissolved. However, the RESS process using supercritical carbon dioxide may be applicable to only a specific supercritical material and the solubility of the majority of materials of interest is low, thus having a disadvantage that a great amount of supercritical carbon dioxide should be consumed even when recrystallizing a small quantity of powder particles. Due to this, the RESS process using supercritical carbon dioxide has not been widely used because of having a low efficiency in recrystallizing fine powder particles.

Furthermore, the size of the existing RDX particles recrystallized using the recrystallization from solution process is large and the particle distribution is not uniform, thus having a limit in enhancing explosive performance. Accordingly, it may be required to enhance powder performance by miniaturizing the size of particles. However, the sensitivity of powder tends to be increased as reducing the size of particles, and thus studies for recrystallizing fine spherical RDX particles having insensibility while enhancing the performance of powder are needed. However, technologies for enhancing RDX particles recrystallization and productivity required in the above using a supercritical process have not been reported until now.

SUMMARY OF THE INVENTION

The present invention is contrived to solve the foregoing problem, and an object of the present invention is to provide a method of recrystallizing fine spherical RDX particles by introducing a supercritical process and enhancing a precipitation rate, and fine spherical RDX particles recrystallized with the recrystallization method according to the present invention.

The method for recrystallizing fine spherical RDX particles according to the present invention may include (a) introducing a powder material containing RDX into a container, (b) introducing a dimethylether compressed gas into the container and dissolving the RDX to form a RDX solution, (c) releasing and decompressing the RDX solution into atmospheric pressure to form crystallized RDX particles, and (d) separating and collecting the RDX particles.

According to the present invention, it may be possible to obtain spherical RDX particles having a fine (in the nanometer unit) and uniform size by the RESS process using a dimethylether compressed gas. The fine spherical RDX particles recrystallized according to a recrystallization method according to the present invention may be spherical particles having a diameter of less than 1 μm, and thus may be used for the recrystallization of high-performance powder having insensibility. The method of recrystallizing RDX particles according to the present invention may be eco-friendly because non-toxic dimethylether is used as a solvent, and dimethylether can be collected and reused subsequent to the recrystallization of particles, thereby reducing the recrystallization cost and providing economical benefit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
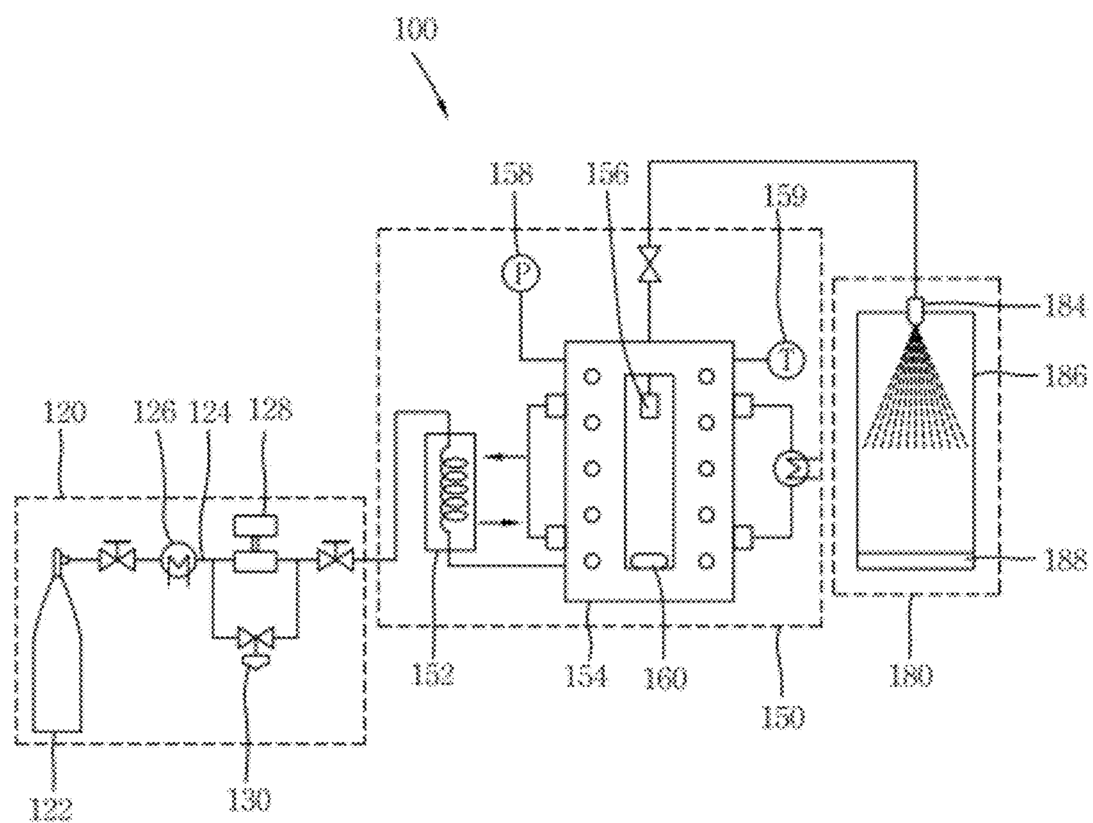
FIG. 1 is a block diagram illustrating a RESS processing device applied to recrystallize RDX particles according to an embodiment of the present invention.

A method for recrystallizing fine spherical RDX particles according to the present invention may include (a) introducing a powder material containing RDX into a container, (b) introducing a dimethylether compressed gas into the container and dissolving the RDX to form a RDX solution, (c) releasing and decompressing the RDX solution into atmospheric pressure to form crystallized RDX particles, and (d) separating and collecting the RDX particles, and the crystallized RDX particles recrystallized by a recrystallization method according to the present invention may be spherical particles having a diameter of 0.1 to 1 μm.

The dimethylether compressed gas at step (b) may be introduced with temperatures of 40 to 150° C. and pressures of 80 to 450 bar, and at least any one gas selected from a group consisting of carbon dioxide, propane, and chlorodifluoromethane may be introduced by mixing it into the dimethylether compressed gas at step (b).

Step (c) may be a rapid release process of a pressurized gas solution, and the method may further include (e) cooling and compressing the remaining dimethylether from which RDX particles are separated to reintroduce it into step (b) subsequent to step (d).

Furthermore, the method may include fine spherical RDX particles recrystallized by a recrystallization method according to the present invention.

Hereinafter, a method of recrystallizing fine RDX particles according to an embodiment of the present invention will be described with reference to the accompanying drawings. However, the embodiment is merely for the description of the present invention but the present invention is not limited to this.

The terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

It should be noted that the terms used herein are merely used to describe a specific embodiment, but not to limit the present invention. Incidentally, unless clearly used otherwise, expressions in the singular number include a plural meaning. In this application, the term “comprising,” “including,” or the like, intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains. The terms used herein shall not be interpreted not only based on the definition of any dictionary but also the meaning that is used in the field to which the invention pertains. Also, unless clearly defined, the terms used herein shall not be interpreted too ideally or formally.

Apparatus for Recrystallizing Fine RDX Particles and Method Using the Same

FIG. 1 is a block diagram illustrating a RESS processing apparatus applied to recrystallize RDX particles according to an embodiment of the present invention. As illustrated in FIG. 1, a Rapid Expansion of Supercritical Fluid Solutions (RESS) apparatus 100 used herein may include a dimethylether supply unit 120, a powder particles dissolution unit 150, and a powder collection unit 180.

The dimethylether supply unit 120 may include a dimethylether high pressure container 122, a supply line 124, a precooler 126, a high pressure pump 128, and a back pressure regulator (BPR) 130.

As an example, the dimethylether high pressure container 122 is a storage container for accommodating dimethylether for dissolving RDX. The supply line 124 is a line for providing dimethylether accommodated in the dimethylether high pressure container 122 to the powder particles dissolution unit 150. The precooler 126 is a heat exchanger, provided on the supply line to cool dimethylether, thereby allowing the high pressure pump to be smoothly operated. The high pressure pump 128 is a unit provided on the supply line to primarily apply a pressure, thereby allowing the supplied dimethylether to be a supercritical or high pressure liquid state. The pressure regulator 130 is a unit provided on a supply line in parallel to the high pressure pump to constantly maintain a pressure of the dissolution unit while high pressure dimethylether is continuously supplied to the powder particles dissolution unit 150 and the powder collection unit 180. Though not shown in the drawing, the apparatus may further include a second gas supply unit for additionally supply gas such as $CO_2$, propane, HCFC-22, and the like.

The powder particles dissolution unit 150 may include a precooler 152, a high pressure container 154, a first filter 156, a pressure gauge 158, a thermometer 159, and a mixer 160. As an example, the precooler 152 is a unit provided to cover part of the supply line, and attached to the supply line to apply heat to dimethylether to have a predetermined temperature. The high pressure container 154 receives a dimethylether compressed gas while accommodating a powder material (solute) containing RDX particles to provide a space in which the RDX particles are dissolved. The first filter 156 allows dimethylether in which RDX particles are dissolved to be permeated therethrough, and RDX particles that are not dissolved in dimethylether from the powder material to be filtered out. The pressure gauge 158 and thermometer 159 measure a pressure and a temperature inside the high pressure container 154. At this time, the compressed gas dimethylether may preferably have temperatures of 40 to 60° C. and pressures of 80 to 150 bar.

The powder collection unit 180 may include a spray nozzle 184, an expansion chamber 186, and a second filter 188. As an example, the expansion chamber 186 receives RDX dissolved dimethylether from the high pressure chamber to provide a space in which the dissolved RDX particles are precipitated. The spray nozzle 184 is provided within the expansion chamber 186, and allows RDX particles having a fine size to be precipitated by bursting dimethylether flowed from the high pressure chamber into the expansion chamber at a low pressure, thereby allowing RDX particles having a fine size to be precipitated. The second filter 188 is provided within the expansion chamber to filter out fine RDX particles precipitated in the expansion chamber.

Figure 2:
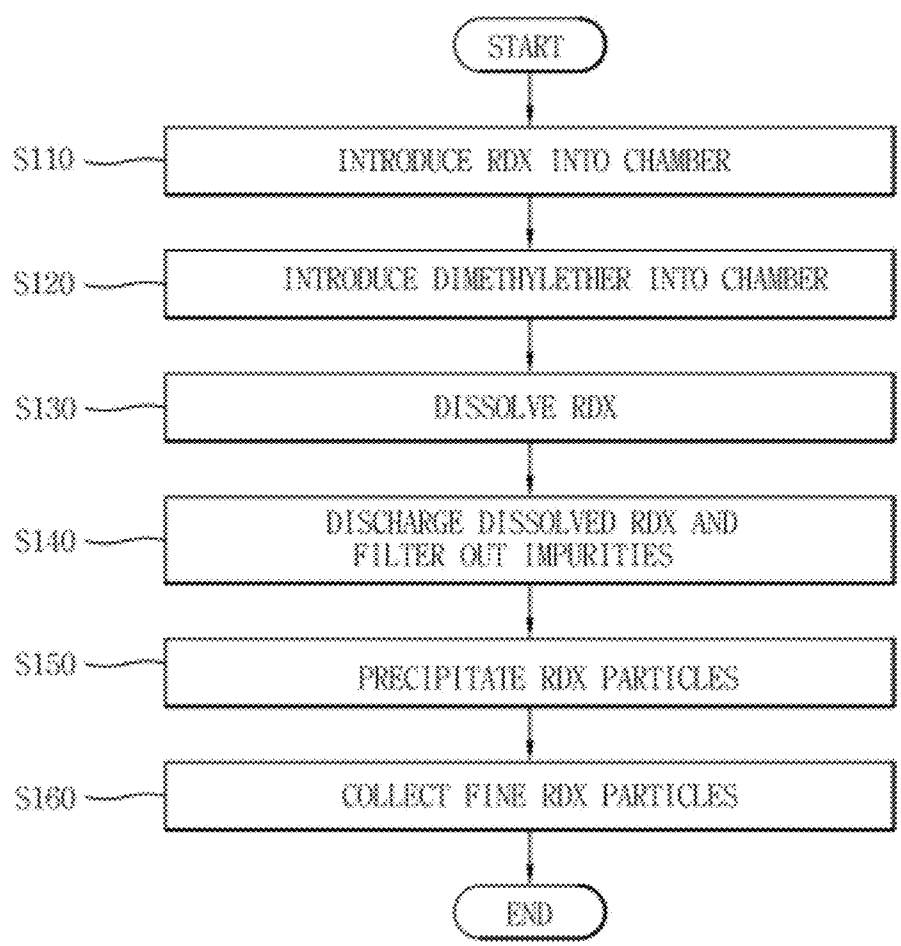
FIG. 2 is a process flow chart illustrating the method of recrystallizing RDX particles according to an embodiment of the present invention.

FIG. 2 is a process flow chart illustrating the method of recrystallizing RDX particles according to an embodiment of the present invention. Referring to FIG. 2, RDX containing impurities is introduced into the RESS apparatus (step S110). RDX containing impurities is introduced into the high pressure chamber 154 of the RESS apparatus illustrated in FIG. 1.

Subsequently, a dimethylether compressed gas is introduced into the RDX introduced high pressure chamber (step S120).

At step S120, dimethylether is flowed into the high pressure chamber 154 by the dimethyl ether supply unit 120 illustrated in FIG. 1 to be brought into contact with RDX. More specifically, dimethylether is maintained at a liquid or supercritical state by the high pressure pump 128 and the pressure regulator 130 and then flowed into the high pressure chamber 154 through the supply line. The compressed gas dimethylether flowed into the chamber has temperatures of 40 to 60° C. and pressures of 80 to 150 bar.

According to another embodiment, a compressed dimethylether mixed gas instead of the dimethylether may be flowed into the high pressure chamber. At this time, instead of the compressed dimethylether gas, a mixed gas may be used in which at least any one additional gas selected from a group consisting of carbon dioxide, propane, and chlorodifluoromethane is mixed with dimethylether. A single gas or two or more gases mixed with one another may be used for the additional gas.

Subsequently, RDX is dissolved by using a dimethylether compressed gas (step S130). At this time, RDX is not completely dissolved in dimethylether due to irregular sizes of impurities and particles. Accordingly, the remaining RDX and impurities may exist in a undissolved state in dimethylether.

Subsequently, RDX dissolved dimethylether is filtered out by using a filter (step S140).

The step S140 is a process of discharging RDX dissolved dimethylether out of the high pressure container, and filtering out undissolved RDX and impurities using the first filter provided in the high pressure chamber.

Subsequently, RDX particles are precipitated from the RDX dissolved dimethylether by quickly decompressing the RDX dissolved dimethylether compressed gas into atmospheric pressure (step S150).

At step S150, the precipitation of RDX particles may be carried out by spraying the RDX dissolved dimethylether compressed gas into the expansion chamber through a spray nozzle provided within the expansion chamber 186. More specifically, if the RDX dissolved dimethylether compressed gas is sprayed through a nozzle and discharged into the expansion chamber at atmospheric pressure, then dimethylether is evaporated by a pressure difference. At this time, RDX that has been dissolved in dimethylether is precipitated to be recrystallized into fine particles. In particular, RDX recrystallized under the condition of 60° C. and 80 bar may have a very fine and highly uniform particle state.

Subsequently, the process of collecting fine RDX particles recrystallized at the step S150 may be further carried out (step S160).

Relation of the Solubility of RDX to Dimethylether

Hereinafter, RDX showing high solubility to a dimethylether compressed gas will be described in a theoretical approach. Solubility parameter is a method for easily and quickly predicting an interaction level between a solvent and a solute in a mathematical manner, and it is typically confirmed that the probability of a solute to be dissolved in the solvent is high if a solubility parameter difference between the solvent and solute, i.e., $\delta 1-\delta 2<1.7\sim2.0$.

Fedors Equation as expressed in the following equation (1) may be used for a solubility parameter of RDX. The solubility parameter value of RDX calculated by Fedors Equation indicates 10.49. Furthermore, a change of the solubility parameter of RDX is illustrated by using the following equation (2) to calculate a change of the solubility parameter value based on a temperature change of RDX.)

$$\delta_1\left(\frac{\text{cal}}{\text{cm}^3}\right)^{\frac{1}{2}} = \left(\frac{\sum_i (\Delta E_V)_i}{\sum_i (\Delta V)_i}\right) \quad (1)$$

-continued $$\delta_2\left(\frac{\text{cal}}{\text{cm}^3}\right)^{1/2} = \delta_1\left(\frac{V_1}{V_2}\right)^{1.13} = \delta_1\left(\frac{\rho_2}{\rho_2}\right)^{1.13} = \delta_1\left(\frac{T_c - T_2}{T_c - T_1}\right)^{0.33} \tag{2}$$

Figure 3:
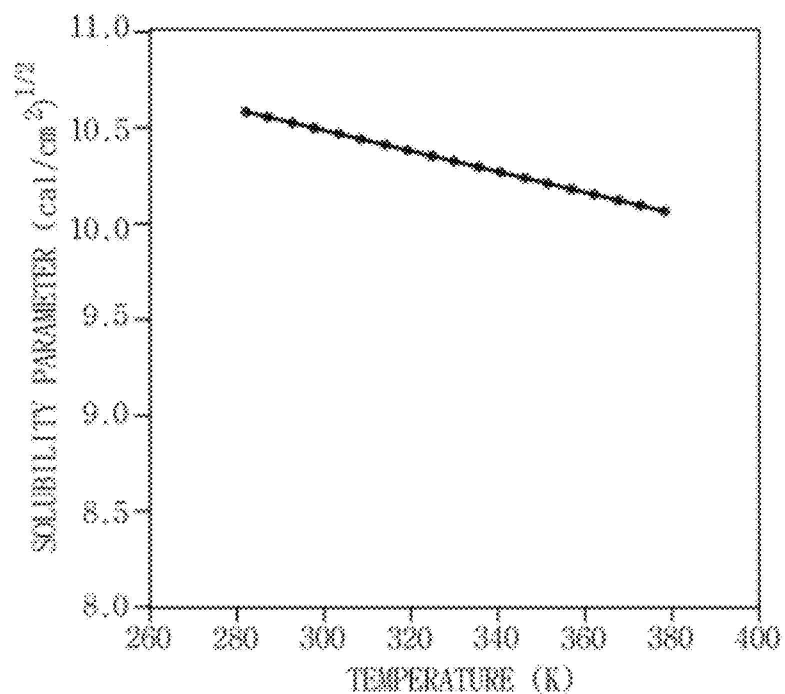
FIG. 3 is a graph illustrating a change of RDX solubility parameter value based on a temperature change.

FIG. 3 is a graph illustrating a change of RDX solubility parameter value based on a temperature change. Referring to FIG. 3, in case of a high pressure fluid containing a supercritical fluid, the solubility parameter is changed based on a temperature and pressure, and thus the following equation (3) proposed by Giddings as an equation including them is used.

$$\delta_1\left(\frac{\text{cal}}{\text{cm}^3}\right)^{1/2} = 1.25(P_c)^{1/2}\left(\frac{p_{\gamma,SF}}{p_{\gamma,L}}\right) \tag{3}$$

Figure 4:
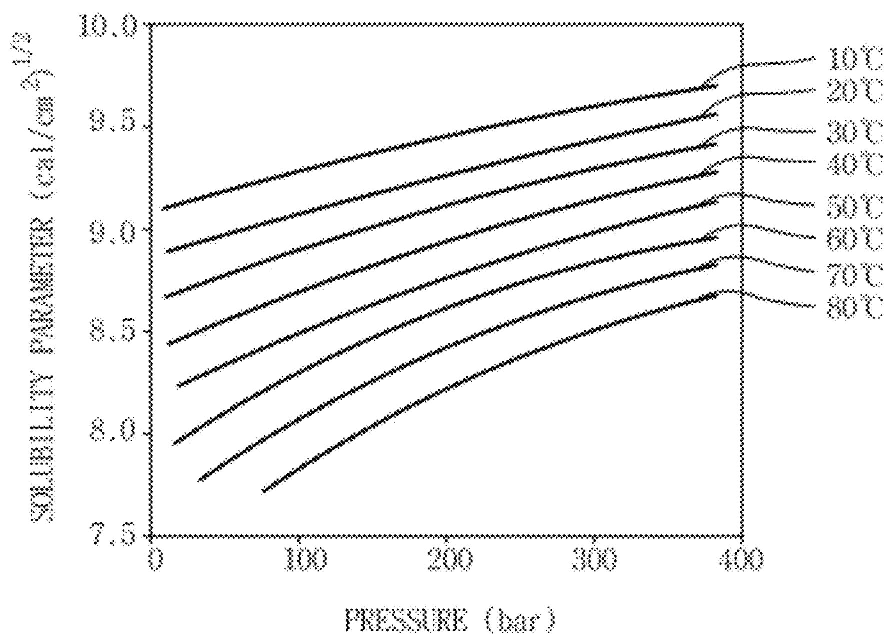
FIG. 4 is a graph illustrating a change of solubility parameter value based on a change of dimethylether temperature and pressure.

FIG. 4 is a graph illustrating a change of solubility parameter value based on a change of dimethylether temperature and pressure. As illustrated in the graph of FIG. 4, it is confirmed that a value of dimethylether solubility parameter is decreased as increasing temperature, and increased as increasing pressure.

Figure 5:
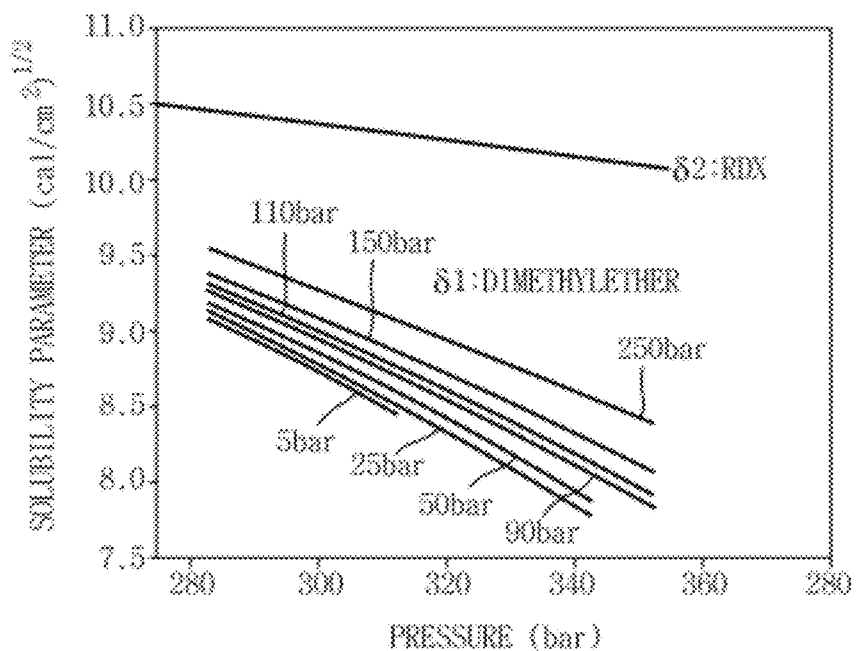
FIG. 5 is a graph illustrating the correlation between RDX and dimethylether solubility parameter values.

FIG. 5 is a graph illustrating the correlation between RDX and dimethylether solubility parameter values. As illustrated in the graph of FIG. 5, it is confirmed that a difference between solubility parameter values for dimethylether having a high pressure liquid state and RDX does not exceed 2. As a result, it may be analyzed that RDX can be dissolved in dimethylether at a high pressure.

Measurement of the Solubility of RDX to Dimethylether Compressed Gas

The solubility of dimethylether to RDX was measured at a predetermined temperature and pressure using a supercritical fluid processing apparatus in FIG. 1 to which a dimethylether compressed gas was applied. As a result of dissolving 400 mg of RDX using a dimethylether compressed gas (80 g) at 40° C. and 150 bar, it was confirmed that RDX was completely dissolved. It showed a 20 times higher solubility under the condition of a lower temperature and pressure, compared to the solubility of 0.25 mg of RDX under supercritical carbon dioxide (1 g) at 80° C. and 480 bar, having an exceptionally higher solubility, and as a result it was confirmed to be a good solvent applicable to the RESS process.

Recrystallization of RDX Particles

A compressed gas dimethylether was introduced to obtain fine spherical RDX particles using the RESS process. At this time, for the process condition for obtaining RDX particles, RDX particles recrystallized under the condition of pressure 150 bar and temperature about 40° C. were obtained.

Assessment of the State of RDX Particles

Figure 6:
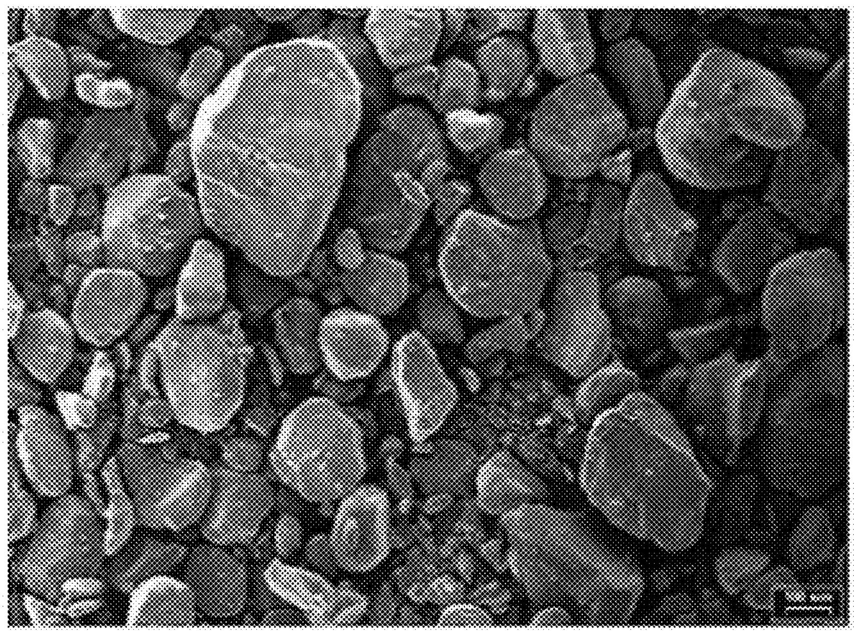
FIG. 6 is a SEM photograph illustrating RDX particles prior to recrystallization.
Figure 7:
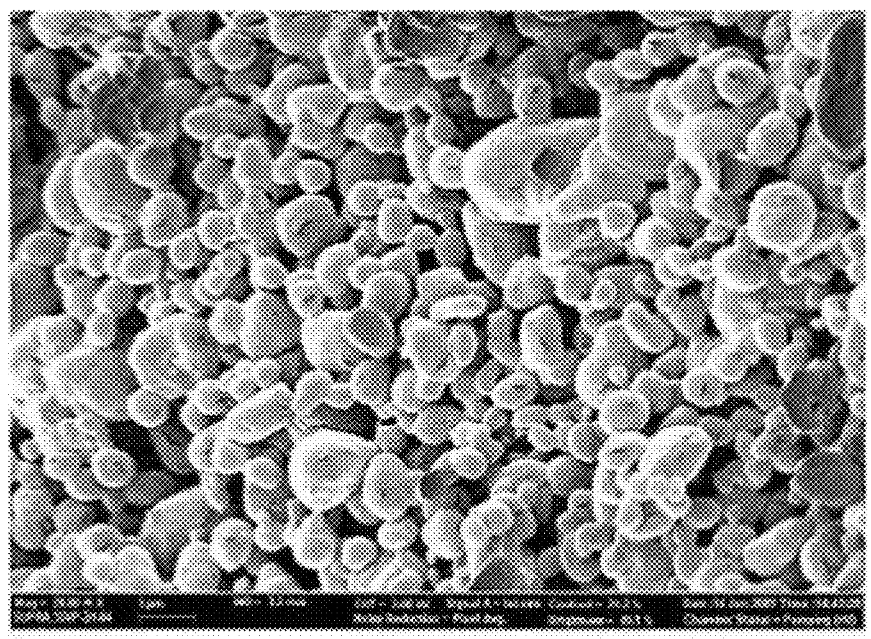
FIG. 7 is a SEM photograph illustrating RDX particles subsequent to recrystallization.

The size and state of RDX particles obtained with the foregoing method was analyzed by using a scanning electron microscopy (SEM). FIG. 6 is a SEM photograph illustrating RDX particles prior to recrystallization, and FIG. 7 is a SEM photograph illustrating RDX particles subsequent to recrystallization. As disclosed in FIG. 7, the recrystallized RDX particles show an agglomerate phenomenon between particles in part but individual particles show a substantially spherical shape. Furthermore, it was confirmed that the RDX particles were formed of particles having a size of less than 1 μm. It was confirmed that the shape of cracked particles in part was deformed by the strong light of the acceleration voltage focused during the process of capturing a SEM photograph.

Assessment of the Crystalline Structure of RDX Particles

Figure 8:
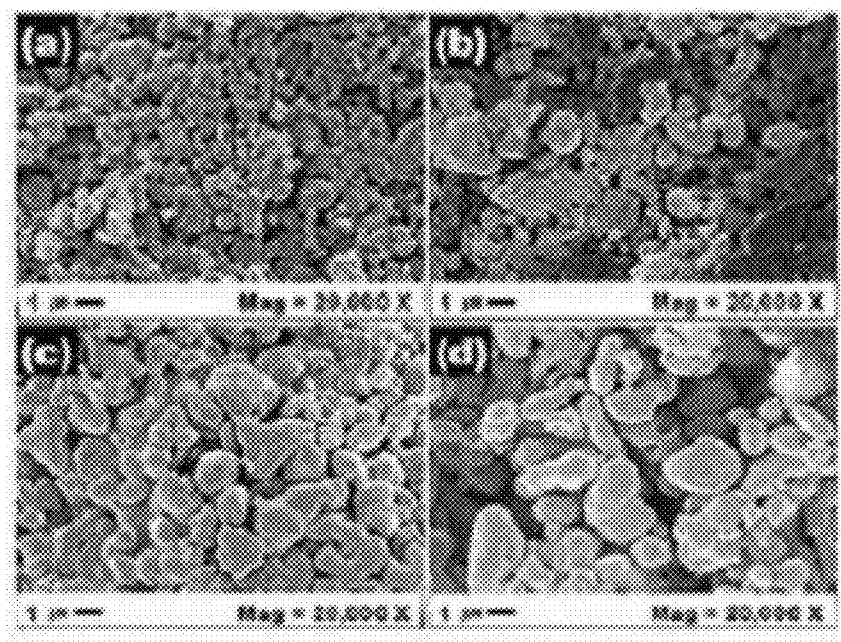
FIG. 8 is a graph illustrating the crystalline structure of RDX particles recrystallized by a method according to an embodiment of the present invention.

The result of RDX particles recrystallized with the foregoing method measured by using an X-ray diffractometer is illustrated in FIG. 8. FIG. 8 is a graph illustrating the crystalline structure of RDX particles formed by a method according to an embodiment of the present invention. As disclosed in the graph of FIG. 8, it was confirmed that the intensity of peaks was slightly decreased since the size of crystallized RDX particles was reduced compared to those prior to recrystallization but the 2θ value of main peaks showing RDX crystallization was identical. At this time, the X-ray diffraction analysis was measured in a region of 10-60 degrees (2θ) at a rate of 5 degrees per minute.

Change of the Size of RDX Particles Based on Temperature

Recrystallized RDX particles were recrystallized by the foregoing method, and fine RDX particles were obtained by changing temperatures of (a) 20° C. (293K), (b) 30° C. (303K), (c) 40° C. (313K), and (d) 50° C. (333K), respectively, under pressure 80 bar. The result is disclosed in FIGS. 9 and 10.

Figure 9:
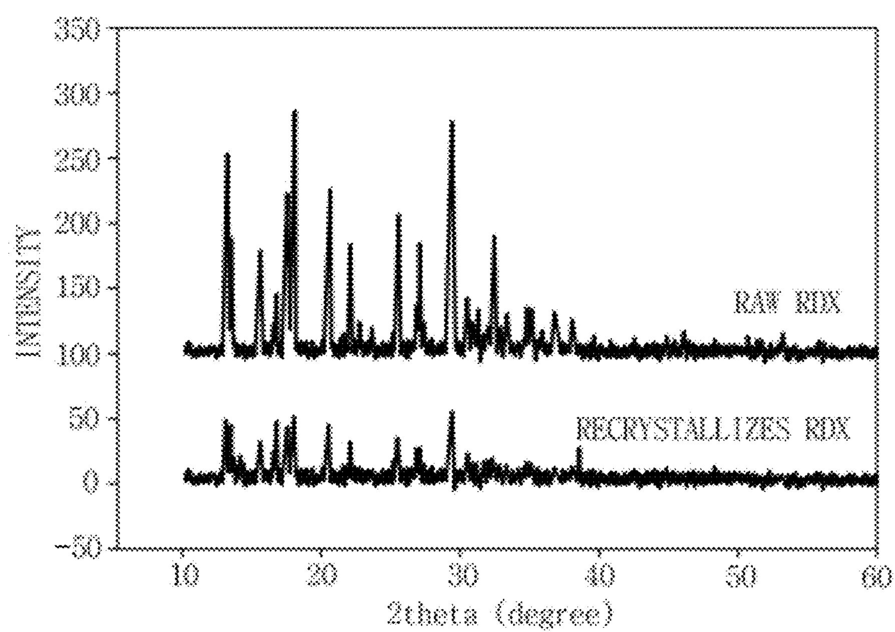
FIG. 9 is a SEM photograph illustrating recrystallized RDX particles based on a temperature change.
Figure 10:
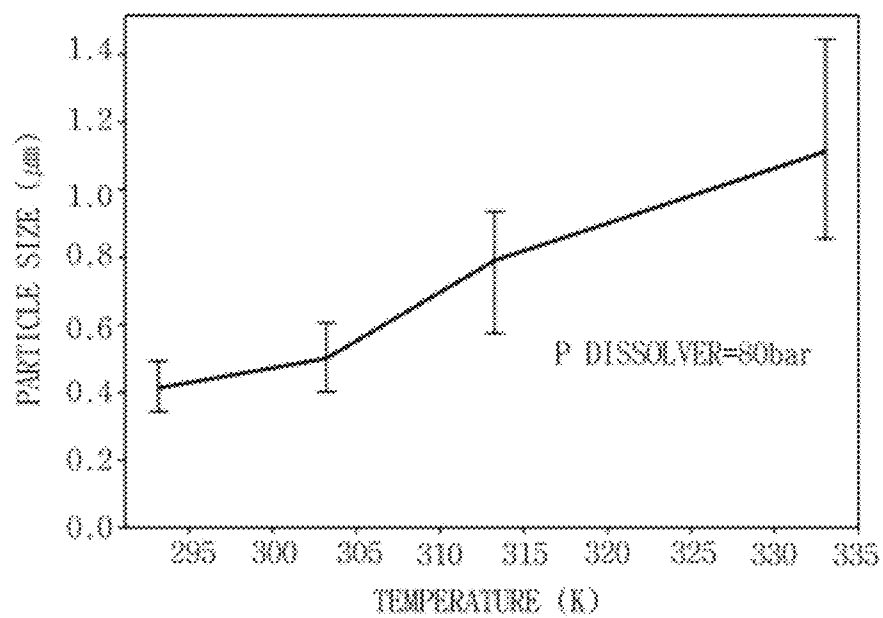
FIG. 10 is a graph illustrating a change of the size of recrystallized RDX particles based on a temperature change.

FIG. 9 is a SEM photograph illustrating recrystallized RDX particles based on a temperature change, and FIG. 10 is a graph illustrating a change of the size of recrystallized RDX particles based on a temperature change. As illustrated in the result of FIGS. 9 and 10, it was confirmed that the size of recrystallized RDX particles was greatly increased as increasing a temperature.

Change of the Size of RDX Particles Based on Pressure

Recrystallized RDX particles were recrystallized by the foregoing method, and recrystallized RDX particles were obtained by changing pressures of (a) 80 bar (8 MPa), (b) 150 bar (15 MPa), (c) 180 bar (18 MPa), and (d) 200 bar (20 MPa), respectively, under temperature 40° C. (313K). The result is disclosed in FIGS. 11 and 12.

Figure 11:
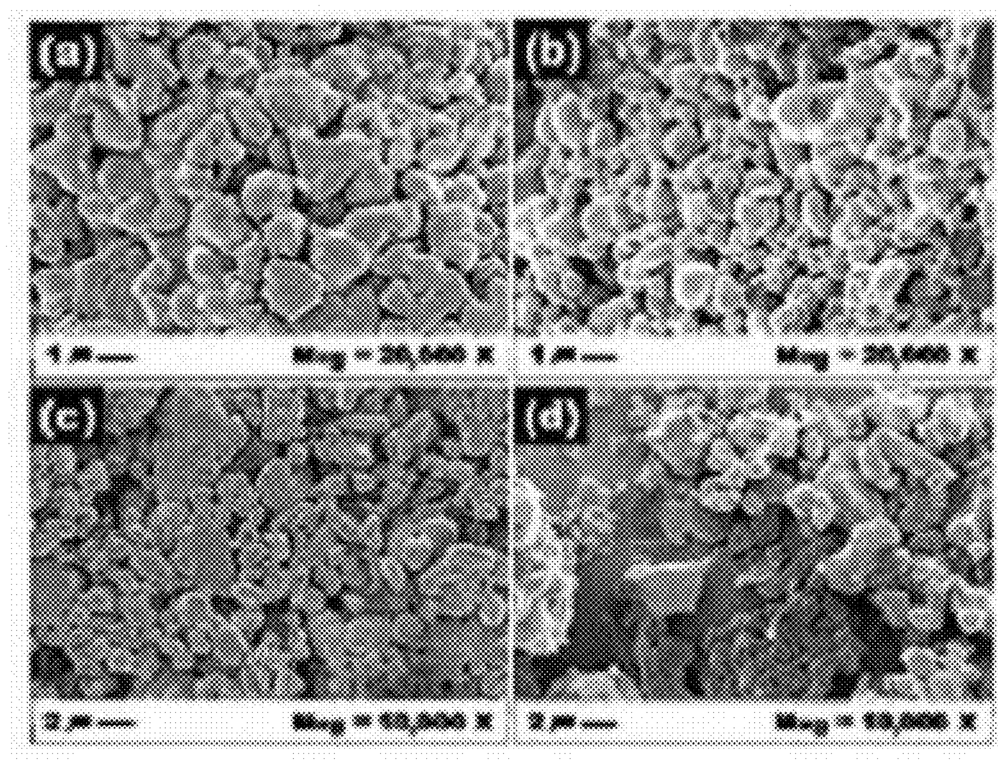
FIG. 11 is a SEM photograph illustrating extracted RDX particles based on a pressure change.
Figure 12:
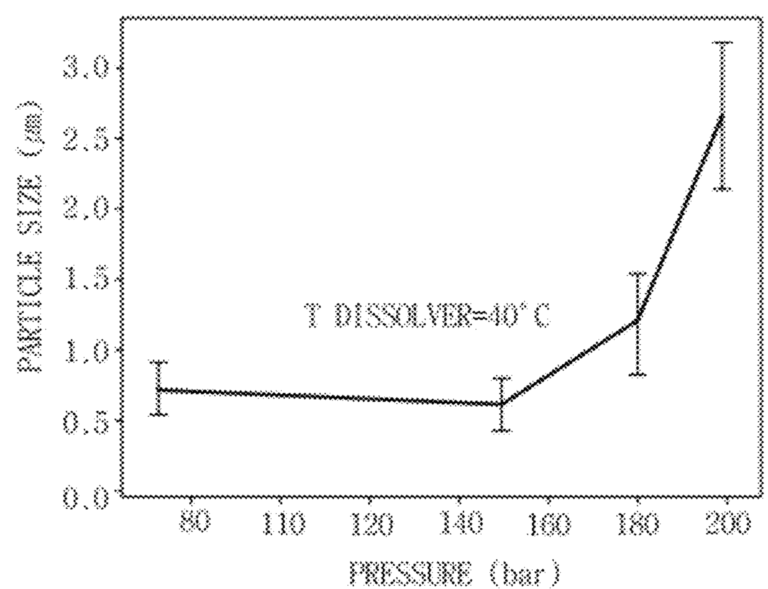
FIG. 12 is a graph illustrating a change of the size of extracted RDX particles based on a pressure change.

FIG. 11 is a SEM photograph illustrating extracted RDX particles based on a pressure change, and FIG. 12 is a graph illustrating a change of the size of extracted RDX particles based on a pressure change. As illustrated in the result of FIGS. 11 and 12, it shows a tendency that the size of recrystallized RDX particles was greatly increased as increasing a pressure. In particular, it was confirmed that the size thereof was abruptly increased by agglomeration and cohesion under pressure above 180 bar.

Figure 13:
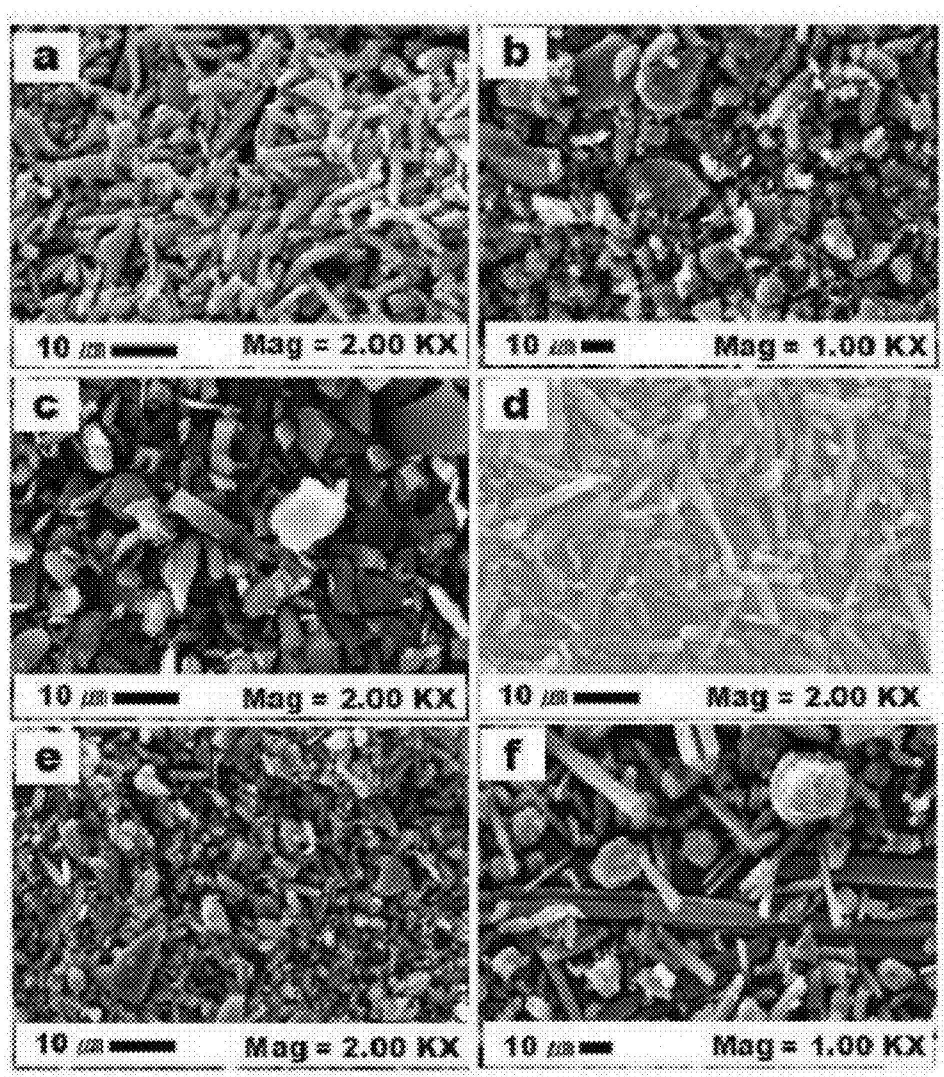
FIG. 13 is a SEM photograph illustrating recrystallized RDX particles based on various organic solvents in the SAS process using compressed gas carbon dioxide.

Recrystallized RDX Particles in the SAS Process Using Supercritical Carbon Dioxide As a comparative example, a SAS process was used herein to compare with RDX particles recrystallized (recrystallized) with the RESS process. FIG. 13 is a photograph illustrating recrystallized RDX particles using various organic solvents in the SAS process using compressed gas carbon dioxide. Here. RDX particles were recrystallized with a method of dissolving RDX particles in various solvents and introducing them into a precipitator through which supercritical carbon dioxide flows. Under the condition of 50° C. and 150 bar, the recrystallization characteristics of RDX particles were disclosed under various organic solvents such as (A) cyclohexanone, (b) dimethylsulfoxide, (c) acetone, (d) acetonitrile, (e) dimethylformamide, and (f) N-methyl-2-pyrrolidone. In case of the SAS process, it is seen that the size of particles is larger than RDX particles recrystallized by the RESS process using a dimethylether compressed gas, and the shape is also irregular and most of them exhibit a bar-shaped form.

As described above, it may be possible to obtain fine spherical RDX particles using a dimethyl-ether compressed gas. The method of recrystallizing RDX particles according to the present invention may be eco-friendly because non-toxic dimethylether is used as a solvent, and dimethylether can be collected and reused subsequent to the recrystallization of particles, thereby providing economical recrystallization cost. Fine RDX particles according to the present invention may be used in high explosive powders and propellants having insensibility with a high explosive performance.

What is claimed is:

1. A method of recrystallizing fine spherical RDX particles, the method comprising:

(a) introducing a powder material containing RDX into a container;

(b) introducing a dimethylether compressed gas as solvent into the container and dissolving the RDX to form a RDX solution;

(c) releasing and decompressing the RDX solution into atmospheric pressure to form crystallized RDX particles; and (d) separating and collecting the RDX particles.

2. The method of claim 1, wherein the crystallized RDX particles are spherical particles having a diameter of 0.1 to 1 μm.

3. The method of claim 1, wherein the dimethylether compressed gas at step (b) is introduced with temperatures of 40 to 150° C. and pressures of 80 to 450 bar.

4. The method of claim 1, wherein at least any one gas selected from a group consisting of carbon dioxide, propane, and chlorodifluoromethane is introduced by mixing it into the dimethylether compressed gas at step (b).

5. The method of claim 1, wherein step (c) is a rapid release process of a pressurized gas solution.

6. The method of claim 1, further comprising:

(e) cooling and compressing the remaining dimethylether from which RDX particles are separated to reintroduce it into step (b) subsequent to step (d).

* * * * *